(12) United States Patent
Lee et al.

(10) Patent No.: US 10,395,086 B2
(45) Date of Patent: Aug. 27, 2019

(54) FLAT PANEL DISPLAY EMBEDDING OPTICAL IMAGING SENSOR

(71) Applicant: LG DISPLAY CO., LTD., Seoul (KR)

(72) Inventors: Guensik Lee, Daegu (KR); Kyoseop Choo, Daegu (KR); Seungman Ryu, Daegu (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 15/969,600

(22) Filed: May 2, 2018

(65) Prior Publication Data
US 2018/0322325 A1    Nov. 8, 2018

(30) Foreign Application Priority Data
May 2, 2017   (KR) .......................... 10-2017-0056309

(51) Int. Cl.
*G06K 9/00*        (2006.01)
*G02F 1/1333*   (2006.01)
(Continued)

(52) U.S. Cl.
CPC ............. *G06K 9/0004* (2013.01); *G02B 5/32* (2013.01); *G02B 6/005* (2013.01); *G02B 6/0055* (2013.01);
(Continued)

(58) Field of Classification Search
CPC ............. G06K 9/0004; G06K 9/00013; G06K 9/00053; G06K 9/00; G02F 1/13338;
(Continued)

(56) References Cited

U.S. PATENT DOCUMENTS 5,745,266 A  *  4/1998  Smith ...................... B60Q 1/30
                                                          359/34
7,845,841 B2    12/2010  Sampsell
(Continued)

FOREIGN PATENT DOCUMENTS

CN        105184282 A      12/2015
EP       3 196 802 A1      7/2017
(Continued)

OTHER PUBLICATIONS

Li et al., "Infrared refractive indices of liquid crystals", 2005, Journal of Applied Physics vol. 97, 073501, pp. 073501-I-073501-5 (published Mar. 18, 2005) (Year: 2005).*

(Continued)

*Primary Examiner* — Nikolay K Yushin
(74) *Attorney, Agent, or Firm* — Seed IP Law Group LLP (57) ABSTRACT

The present disclosure relates to a flat panel display embedding an optical imaging sensor such as a fingerprint image sensor. The present disclosure suggests a flat panel display embedding an image sensor comprising: a display panel including a display area and a non-display area; and a directional optical unit having a length and a width corresponding to the display panel and a thickness, and attached on a top surface of the display panel, wherein the directional optical unit provides a sensing light beam to the display area, and wherein the sensing light is collimated and directionized to a predetermined direction.

5 Claims, 7 Drawing Sheets

(51) Int. Cl.
*H01L 27/00* (2006.01)
*G02B 5/32* (2006.01)
*F21V 8/00* (2006.01)
*H01L 27/32* (2006.01)
*G06F 21/32* (2013.01)
*H01L 27/30* (2006.01)
*G02F 1/1335* (2006.01)

(52) U.S. Cl.
CPC .......... G02F 1/13338 (2013.01); G06F 21/32 (2013.01); H01L 27/307 (2013.01); H01L 27/3234 (2013.01); *G02F 1/133528* (2013.01)

(58) Field of Classification Search
CPC ............ G02F 1/133528; G02F 1/1333; G02F 1/133331; G02B 6/0055; G02B 6/0035; G02B 6/0088; G02B 6/102; G02B 5/32; G02B 5/20; G02B 5/3025; H01L 27/3234; H01L 27/323; H01L 27/3244
See application file for complete search history.

(56) References Cited

U.S. PATENT DOCUMENTS

| | | | |
|---|---|---|---|
| 8,564,314 B2 | 10/2013 | Shaikh et al. | |
| 9,280,237 B2* | 3/2016 | Kukulj | G06F 3/0428 |
| 9,829,614 B2* | 11/2017 | Smith | G02B 27/58 |
| 9,841,563 B2* | 12/2017 | Lapstun | G02B 6/34 |
| 2004/0252867 A1* | 12/2004 | Lan | G06K 9/0004 |
| | | | 382/124 |
| 2007/0013679 A1 | 1/2007 | Gruhlke | |
| 2010/0142892 A1 | 6/2010 | Kuittinen et al. | |
| 2012/0223916 A1* | 9/2012 | Kukulj | G06F 3/0421 |
| | | | 345/175 |
| 2013/0021300 A1* | 1/2013 | Wassvik | G06F 3/0421 |
| | | | 345/175 |
| 2013/0063399 A1 | 3/2013 | Noro et al. | |
| 2013/0307818 A1 | 11/2013 | Pope et al. | |
| 2016/0139402 A1* | 5/2016 | Lapstun | G02B 6/34 |
| | | | 349/193 |
| 2016/0224816 A1* | 8/2016 | Smith | G02B 27/58 |
| 2016/0342282 A1* | 11/2016 | Wassvik | G02F 1/13338 |
| 2017/0315293 A1* | 11/2017 | Bang | G02B 6/102 |
| 2017/0372113 A1* | 12/2017 | Zhang | G02B 5/3025 |
| 2018/0005003 A1* | 1/2018 | Ryu | G01B 7/004 |

FOREIGN PATENT DOCUMENTS

| | | |
|---|---|---|
| KR | 10-0608171 B1 | 8/2006 |
| KR | 10-2011-0095565 A | 8/2011 |
| KR | 10-1432988 B1 | 8/2014 |
| KR | 10-2015-0078823 A | 7/2015 |
| KR | 10-2016-0043216 A | 4/2016 |
| WO | 2009/020940 A2 | 2/2009 |
| WO | 2015/108477 A1 | 7/2015 |

OTHER PUBLICATIONS

Li et al., "Refractive Indices of Liquid Crystals for Display Applications", 2005, IEEE/OSA Journal of Display Technology, vol. 1, No. 1, pp. 51-61(published Sep. 2005) (Year: 2005).*
Advisory Action, dated Feb. 15, 2019, for U.S. Appl. No. 15/582,001, Bang et al., "Flat Panel Display Embedding Optical Imaging Sensor," 6 pages.
Extended European Search Report, dated Sep. 26, 2017, for European Application No. 17168110.9-1562, 12 pages.

* cited by examiner

$T_{CP\_AIR} < \alpha < T_{VHOE\_LR} < \theta$ ex) $45° < \alpha < 55°$
$70° < \theta < 75°$

FIG. 7

FLAT PANEL DISPLAY EMBEDDING OPTICAL IMAGING SENSOR

CROSS REFERENCE TO RELATED APPLICATION(S)

This application claims the benefit of Korea Patent Application No. 10-2017-0056309, filed May 2, 2017, which is incorporated herein by reference for all purposes as if fully set forth herein.

BACKGROUND

Technical Field

The present disclosure relates to a flat panel display embedding an optical imaging sensor such as a fingerprint image sensor. In particular, the present disclosure relates to a flat panel display embedding an optical imaging sensor including an ultra thin substrate providing the directional lights and an optical imaging sensor.

Description of the Related Art

Various computer based systems including the notebook computer, the tablet personal computer (or, PC), the smart phone, the personal digital assistants, the automated teller machines and/or the search information system have been developed. As these devices use and store the various personal information as well as the business information and the trade secrets, it is desirable to strengthen the securities for preventing these important data being leaked.

To do so, one method has been suggested for strengthening the security using an image sensor recognizing the authorized user's biological information. For example, the fingerprint sensor is generally used for enhancing the security when registering and authenticating is performed. The fingerprint sensor is for sensing the fingerprint of user. The fingerprint sensor may be categorized into the optical fingerprint sensor and the capacitive fingerprint sensor.

The optical fingerprint sensor uses a light source such as a light emitting diode (or LED) to irradiate lights and detects the lights reflected by the ridge of the fingerprint using a CMOS (or, complementary metal oxide semiconductor) image sensor. As the optical fingerprint sensor may scan the fingerprint using the LED lights, it is required that the sensor is equipped with an additional device for performing the scan process. There is a limitation to increasing the size of the object for scanning the image. Therefore, there are limitations for applying the optical fingerprint sensor to various applications such as combining with the display devices.

For conventional optical fingerprint sensors, known are a Korean patent 10-060817 registered on Jun. 26, 2006 of which title is "A display apparatus having fingerprint identification sensor" and a Korean patent application 10-2016-0043216 published on Apr. 21, 2016 of which title is "Display device including fingerprinting device."

The above mentioned optical fingerprint sensor is configured to use the display area as the touch area for inputting the user's selection and the sense area for sensing the fingerprint. However, this optical fingerprint sensor uses the diffused (or diverged) lights having very low directivity. Therefore, there is a limitation to recognize the exact fingerprint pattern. When using the collimated lights such as the infrared laser having high directivity, it is very hard to generate the sensing lights to cover the wider area. Therefore, the fingerprint sensing area is restricted in a small area. In order to radiate the collimated lights over the wider scan area, specific scanning structure is required, so that this system is not suitable for portable or personal display apparatus.

Therefore, for portable devices embedding the fingerprint sensor, the capacitive fingerprint sensor is mainly used. However, the capacitive fingerprint sensor also has many problems.

The capacitive fingerprint sensor is configured to detect the difference of the electricity between the ridge and the valley of the fingerprint contacting on the fingerprint sensor. For conventional capacitive fingerprint sensors, known is a US patent application 2013/0307818 published on Nov. 21, 2013 of which title is "Capacitive Sensor Packaging."

The above mentioned capacitive fingerprint sensor is configured as an assembly type embedding with a specific push button. It comprises a capacitive plate and a silicon wafer having a circuit for detecting the capacitive storage between the ridge and valley of the fingerprint. Generally, as the sizes of the ridge and valley of the fingerprint are very tiny, about 300~500 μm (micrometer), the capacitive fingerprint sensor needs a high resolution sensor array and an integrated chip (or IC) for processing the fingerprint detection. To do so, the silicon wafer is configured to include the sensor array and the IC on one substrate.

However, when the high resolution sensor array and the IC are formed on the same silicon wafer, the assembly structure for joining the push button with the fingerprint sensor is required. Therefore, the structure would be very complex and further the non-display area (or bezel area) may be increased. In some cases, the push button (i.e., the home key of the smart phone) would be overlapped with the fingerprint sensor, so that the thickness of the whole device would be thick. Further, the sensing area for the fingerprint would be dependent on the size of the push button.

To solve above mentioned problems and limitations, some technologies have been suggested in which the touch sensor area is used as for sensing the fingerprint. For example, known are U.S. Pat. No. 8,564,314 issued on Oct. 22, 2013 of which title is "Capacitive touch sensor for identifying a fingerprint," and Korean patent 10-1432988 registered on Aug. 18, 2014 of which title is "A capacitive touch screen for integrated of fingerprint recognition."

In general cases of the personal portable devices such as the smart phones, an additional transparent film is attached for protecting the display glass panel. When the above mentioned technologies are applied to the personal portable devices, as attaching the protective film thereon, the performance for sensing or recognizing the fingerprint exactly would be remarkably degraded. In general, even though the protective film is attached, the touch function may be properly operated. However, the detection ability for the difference of the capacitive storage amount for sensing the fingerprint may be deteriorated by the protective film even though its thickness is very thin.

For a display embedding the capacitive fingerprint sensor, generally a protective film or a hardening glass may be further attached on the cover glass of the display. In that case, the recognition ability may be deteriorated. That is, the total thickness of the cover glass may affect to the sensitivity of the capacitive fingerprint sensor. In the interim, the diffused lights used in the sensing light source may affect to the sensitivity of the optical fingerprint sensor. When using the collimated lights for enhancing the sensitivity of the optical fingerprint sensor, the bulky and/or complex optical devices are required so that it is very hard to apply to a display for personal mobile device.

Consequently, there is a need for a new type optical image sensor capable of large area sensing, excellent resolution and accuracy, and having an ultra thin thickness structure. In particular, there is an increasing need for an optical image sensor which is easy to develop various information processing apparatuses in combination with the flat panel displays.

SUMMARY

In order to overcome the above mentioned drawbacks, a purpose of the present disclosure is to provide a flat panel display embedding an ultra thin optical image sensor (or an optical image recognition apparatus). Another purpose of the present disclosure is to provide a flat panel display having an optical image sensor in which most or all of a surface of the display panel may be used for the sensing area. Still another purpose of the present disclosure is to provide a flat panel display embedding an optical image sensor in which a directional light beam is used as a sensing light covering a large surface area. Yet another purpose of the present disclosure is to provide a flat panel display embedding an ultra thin and large area optical image sensor of which resolution and sensitivity are very high and/or superior.

In order to accomplish one or more of the above purposes, the present disclosure provides a flat panel display embedding an image sensor comprising: a display panel including a display area and a non-display area, the display panel having a top surface; and a directional optical unit attached to the top surface of the display panel, the directional optical unit having a length along a length axis of the display panel, a width along a width axis of the display panel and a thickness along to a thickness axis of the display panel, wherein the directional optical unit provides a sensing light beam to the display area, and wherein the sensing light beam is collimated and directionized along a predetermined direction.

In one embodiment, the directional optical unit includes: a cover plate having a size corresponding to the length and the width of the directional optical unit; a light radiating film corresponding to the display area, the light radiating film positioned under the cover plate; a light incident film positioned under the cover plate and disposed outside of the display area adjacent to a lateral side of the light radiating film; a low refractive layer disposed under the light radiating film and the light incident film, the low refractive layer attached on the top surface of the display panel, and having a refractive index that is lower than a refractive index of the cover plate and that is lower than a refractive index of the light radiating film; and a light source positioned under the light incident film.

In one embodiment, the light source provides an incident light to an incident point defined on a surface of the light source provides an incident light to an incident point on a surface of the light incident film; the light incident film includes a first holographic pattern that converts the incident light to a propagating light beam having an incident angle satisfying an internal total reflection condition of the cover plate, and that transmits the propagating light beam into the cover plate; and the light radiating film includes a second holographic pattern that converts a first portion of the propagating light beam into the sensing light, the sensing light beam having a reflection angle that satisfies a total reflection condition at a top surface of the cover plate and that satisfies a transmitting condition through the low refractive layer.

In one embodiment, the propagating light beam has an expanding angle on a horizontal plane including the length axis and the width axis, and the propagating light beam or beams maintains the collimated state on a vertical plane including the length axis and the thickness axis; the incident angle is a larger than an internal total reflection critical angle at a first interface between the light radiating film and the low refractive layer; and the reflection angle is larger than a total reflection critical angle at a second interface between the cover plate and an air layer, and smaller than a total reflection critical angle at the first interface between the light radiating film and the low refractive layer.

In one embodiment, the light incident film has a first polarization axis along to a predetermined direction; and the light source provides an infrared light polarized in a second polarization axis which is parallel to the first polarization axis.

In one embodiment, the light radiating film has a third polarization axis parallel to the first polarization axis.

In one embodiment, the display panel further includes a polarization plate disposed on the top surface and having a fourth polarization axis parallel to the first polarization axis.

The present disclosure provides a flat panel display embedding an optical image sensor that has a high resolution recognizing ability or sensitivity by providing the directionized lights (or 'oriented') as the sensing lights, which can also be characterized as light beams. Comparing with the diffused lights used in the conventional art for the fingerprint sensor, because that the directionized lights according to the present disclosure are used for sensing the image without any loss of lights, the present disclosure has the merits of the higher resolution and the superior sensitivity. The present disclosure provides a flat panel display embedding a large area optical image sensor in which a collimated infrared laser beam is expanded over a large area corresponding to the display panel for the sensing lights using a holography technology. The present disclosure provides a flat panel display having an ultra thin optical image sensor in which a direction light is provided on the display surface within a thin thickness. Further, the present disclosure provides a flat panel display embedding an optical image recognition sensor that maximizes the light efficiency and has high performance recognition capability by using a light source that provides the polarized light parallel to the polarization axis of the holographic element.

BRIEF DESCRIPTION OF THE SEVERAL VIEWS OF THE DRAWINGS

The accompanying drawings, which are included to provide a further understanding of the disclosure and are incorporated in and constitute a part of this specification, illustrate embodiments of the disclosure and together with the description serve to explain the principles of the disclosure.

In the drawings.

DETAILED DESCRIPTION

Referring to the attached figures, one or more preferred embodiments of the present disclosure will be explained. Like reference numerals designate like elements throughout the detailed description. However, the present disclosure is not restricted by these embodiments but can be applied to various changes or modifications without changing the technical spirit of the disclosure. In the following embodiments, the names of the elements are selected by considering the easiness for explanation so that they may be different from actual names.

<First Embodiment>

Figure 1A:
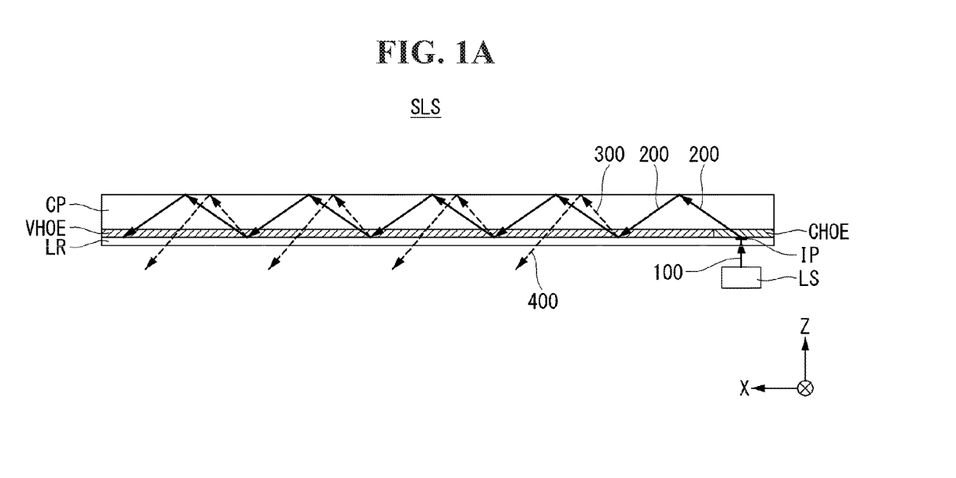
FIGS. 1A and 1B are drawings illustrating a structure of a directional optical substrate applied for a flat panel display embedding an optical image sensor according to a first embodiment of the present disclosure.

Hereinafter, referring to FIGS. 1A, 1B and 2, a first embodiment of the present disclosure will be described. FIG. 1A is a drawing illustrating a structure of a directional optical substrate applied for a flat panel display embedding an optical image sensor according to the first embodiment of the present disclosure. In FIG. 1A, the upper drawing is a side view on the XZ plane and FIG. 1B is a plane view on the XY plane.

Figure 1B:
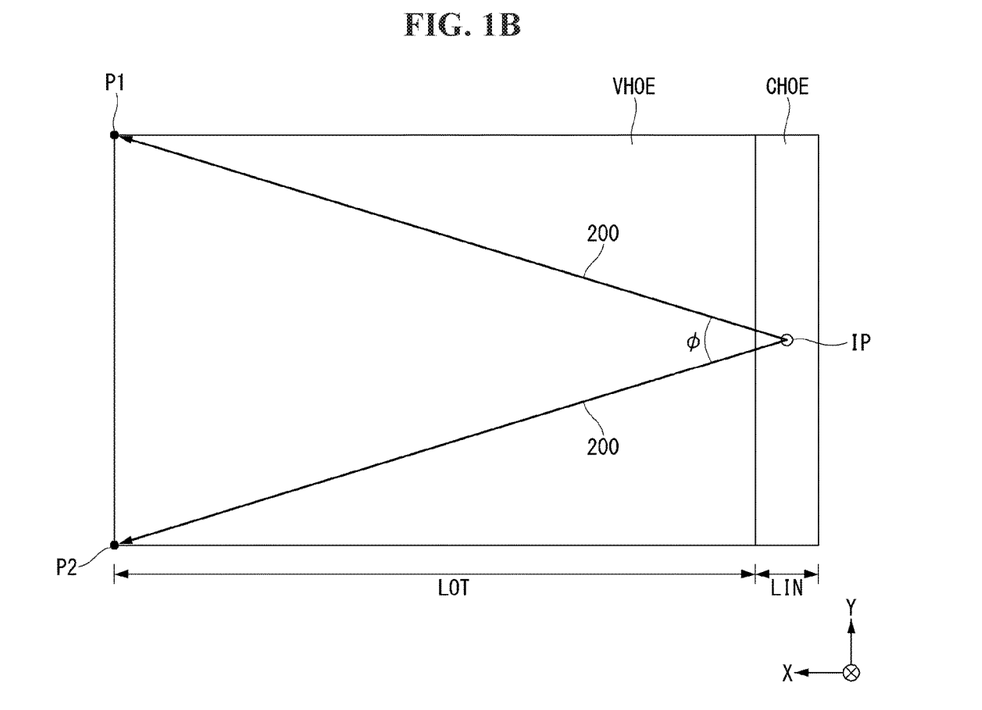
Figure 2:
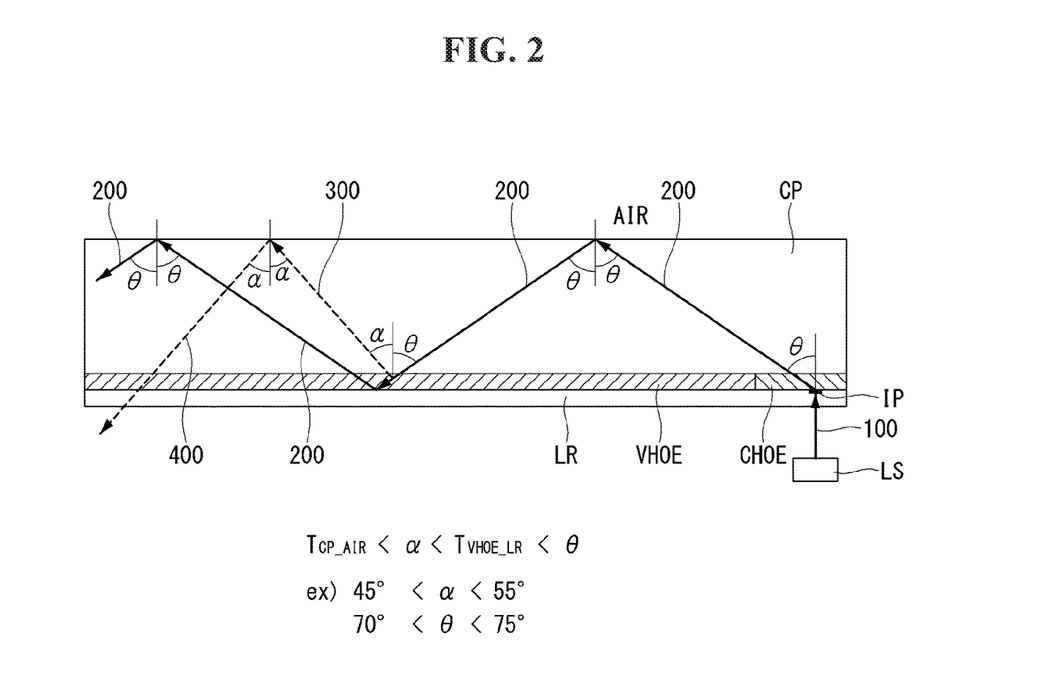
FIG. 2 is a cross sectional view illustrating light paths inside of the direction optical substrate shown in FIG. 1.

Referring to FIGS. 1A and 1B, a directional optical unit according to the first embodiment comprises a directional optical substrate SLS and a light source LS. The directional optical substrate SLS includes a cover plate CP, a light radiating film VHOE, a light incident film CHOE and a low refractive layer LR. The cover plate CP may have a rectangular plate shape of which a length, a width and a thickness. In FIG. 1, the length is along to X-axis, the width is along to Y-axis and the thickness is along to Z-axis.

The directional optical substrate SLS is an optical device for providing the collimated light expanded covering a large area corresponding to a surface of the display. Therefore, it is preferable that the light source LS provides a collimated light. For example, the light source LS may be a laser diode providing the infra red laser beam. Since the infra red laser beam is very highly collimated, it is very suitable as the light source LS for the directional light unit according to the present disclosure. Alternatively, the light source LS may be an infrared diode providing an infrared ray having a very narrow expanding angle less than 10 degrees. When the expanding angle of the infrared ray emitted from the infrared diode is less than 10 degrees, the collimation property is highly enough even if the laser is not used. So that the infrared diode providing the infrared ray of which expanding angle of the ray is less than 10 degrees may be used as the light source LS for the directional light unit of the present disclosure.

The terms "beam" and "light beam" are used herein the broadest sense to include one or more beams. Since a light beam frequently spreads, splits and reflects into multiple beams, the use the term beam is to be understood as including singular as well as multiple rays of light unless a more specific statement is provided.

On the bottom surface of the cover plate CP, the light radiating film VHOE and the light incident film CHOE is attached. The light radiating film VHOE is an optical element for providing the radiating lights 300. It is preferable that the light radiating film VHOE is disposed as corresponding to the area for detecting and/or sensing the image. Alternatively, when the directional optical unit is joined with the flat panel display, the light radiating film VHOE may be disposed as corresponding to the area of the display panel.

The light incident film CHOE is an optical element for converting the collimated light provided from the light source into the lights expanded over the area of the cover plate CP. It is preferable that the light incident film CHOE is disposed outside of and an adjacent to the light radiating film VHOE. Specifically, the light incident film CHOE is disposed as facing with the light source LS.

It is preferable that the light radiating film VHOE and the light incident film CHOE may be disposed on the same plane level. Considering the manufacturing process, it is further preferable that the light radiating film VHOE and the light incident film CHOE are formed as being separated each other, on a same film. It is preferable that the light radiating film VHOE and the light incident film CHOE may be optical elements having the holographic patterns. In this case, after disposing the master film for the light radiating film VHOE and the master film for the light incident film CHOE close each other, these two holographic patterns may be copied on one holographic recording film, at the same time. So that, the light radiating film VHOE and the light incident film CHOE may be formed on one film sheet.

Under the bottom surface of the light radiating film VHOE and the light incident film CHOE, a low refractive layer LR is disposed. It is preferable that the low refractive layer LR has the refractive index lower than that of the cover plate CP and the light radiating film VHOE. For example, the cover plate CP may be formed of a transparent reinforced glass having a refractive index of 1.5. The light radiating film VHOE and the light incident film CHOE may be the transparent holographic recording film and may have a refractive index that is same as or slightly larger than that of the cover plate CP. Here, we use the case that the refractive index of the light radiating film VHOE and the light incident film CHOE are same as that of the cover plate CP. It is preferable that the refractive index of the low refractive layer LR is similar with the refractive index of the scanning objects. For example, when applying to the fingerprint sensor, the low refractive layer LR may have a refractive index of 1.4, which is similar with the refractive index of human skin, 1.39.

At the space under the light incident film CHOE, the light source LS is disposed as facing with the light incident film CHOE. It is preferable that the light source LS provides a highly collimated light such as a LASER beam. Specifically, when applying to the system in which the fingerprint sensor is embedded into a portable display, it is preferable that the light source LS provides the infrared laser beam which cannot be recognized by the human eyes. For example, the light source LS may be selected any one including an infrared diode providing the infrared ray having expanding angle less than 10 degrees and an infrared laser diode providing the infrared laser beam.

The collimated light from the light source LS, as an incident light 100, having a predetermined cross sectional area is provided to a light incident point IP defined on the light incident film CHOE. It is preferable that the incident light 100 enters onto the normal direction with respect to the surface of the incident point IP. However, embodiments provided by the present disclosure are not restricted as such. For example, in one or more embodiments, the incident light 100 may enter onto the incident point IP with an inclined angle with respect to the normal direction.

The light incident film CHOE converts the incident light 100 into a propagating light 200 having an incident angle and sends it into the cover plate CP. Here, it is preferable that the incident angle is larger than the internal total reflection critical angle of the cover plate CP. As the results, as repeating the total reflection, the propagating light 200 is propagating inside of the cover plate CP along to the X-axis, the length direction of the cover plate CP.

The light radiating film VHOE converts some amount of the propagating light 200 into the radiating light 300 and refracts the radiating light 300 to upper surface of the cover plate CP. Other portions of the propagating light 200 would continuously be propagating inside of the cover plate CP. The radiating light 300 is totally reflected at the upper surface of the cover plate CP, but it is transmitted through the low refractive layer LR at the bottom surface of the cover plate CP so that the radiating light 300 goes out of the directional optical substrate SLS. In other words, the radiating light 300 totally reflected at the upper surface of the cover plate CP would be a sensing light beam 400 as passing through the bottom surface of the cover plate CP.

As the propagating light 200 goes from the light incident film CHOE to the opposite side, a predetermined portion of the propagating light 200 is extracted as the radiating lights 300 by the light radiating film VHOE. The amount (or 'brightness' or 'luminance') of the radiating light 300 is determined by the light extraction efficiency of the light radiating film VHOE. For example, when the light extraction efficiency of the light radiating film VHOE is 3%, then 3% of the initial light amount of the propagating light 200 would be extracted at the first radiating point where the propagating light 200 firstly hits to the light radiating film VHOE. Then, the 97% of the propagating light 200 would be totally reflected at the first radiating point and goes on continuously. After that, at the second radiating point, 3% of the 97%, i.e., 2.91% of the initial amount of the propagating light 200 would be extracted as the radiating light 300.

Repeating this operation, a plurality of radiating lights 300 would be extracted from the first side where the light incident film CHOE is disposed to the opposite side of the cover plate CP. When the light radiating film VHOE has the light extraction efficiency same over all areas, the amount of the propagating light 200 is gradually lowered as propagating from the first side to opposite side. In order to get an evenly distributed amount of the lights over the whole area of the light radiating area, it is preferable that the light extraction efficiency of the light radiating film VHOE is exponentially increased from the first side to the opposite side.

As observing the propagating light 200 on the XZ plane (or, 'vertical plane') having the length axis and the thickness axis, the collimated condition of the incident light 100 is maintained. On the contrary, on the XY plane (or, 'horizontal plane') having the length axis and the width axis, it is preferable that the propagating light 200 is a diverged (or, expanded) light having an expanding angle, φ. The reason of expanding the propagating light 200 is that the image sensing area is set as covering most of the area of the cover plate CP. For example, it is preferable that the light radiating film VHOE has an area corresponding to the whole area of the cover plate CP. Further, it is preferable that the expanding angle φ is the inside angle between two lines, one line is connecting the incident point IP and one end point P1 of the opposite side of the cover plate CP and the other line is connecting the incident point IP and another end point P2 of the opposite side of the cover plate CP.

The area where the light incident film CHOE is disposed would be defined as a light entering part LIN. The area where the light radiating film VHOE is disposed would be defined as a light going-out part LOT. The light going-out part LOT would be the light propagating part where the light is going through. In FIG. 1, the light incident film CHOE covers the whole area of the light entering part LIN, in convenience. However, it is enough that the light incident film CHOE has a size slightly larger than the size of the light incident point IP.

For example, the cross sectional size of the collimated light generated from the light source LS may have the right circle shape of which radius is 0.5 mm. The light incident film CHOE would have the length corresponding to the width of the cover plate CP and the width of 3 mm~5 mm. In this case, the light incident film CHOE may be disposed as crossing the width of the cover plate CP. In particular, the light incident film CHOE may be disposed at any one position including the middle position, the left position or the right position of the cover plate CP.

Hereinafter, referring to FIG. 2, we will explain how the collimated infrared light provided from the light source is converted into a directional infrared light used for image sensing inside of the directional optical substrate SLS. FIG. 2 is a cross sectional view illustrating light paths inside of the directional optical substrate according to the FIG. 1.

The incident light 100 provided from the light source LS enters onto the normal direction with respect to the surface of the incident point IP of the light incident film CHOE. The light incident film CHOE converts the incident light 100 into a propagating light 200 refracted as having an incident angle θ to the normal direction with respect to the surface of the incident point IP. And then, the light incident film CHOE provides the propagating light 200 to the inside space (or 'the media') of the cover plate CP.

It is preferable that the incident angle θ of the propagating light 200 is larger than the total reflection critical angle $T_{VHOE\_LR}$ at the interface between the light radiating film VHOE and the low refractive layer LR. For example, when the refraction index of the cover plate CP and the light radiating film VHOE is 1.5, and the refraction index of the low refractive layer LR is 1.4, it is preferable that the total reflection critical angle $T_{VHOE\_LR}$ at the interface between the light radiating film VHOE and the low refractive layer LR is greater than 69° (degree). Therefore, it is preferable that the incident angle θ is larger than 69°. For example, the incident angle θ may be in the range of 70° to 75°, inclusive.

As the upper surface of the cover plate CP is in contact with the air AIR, the propagating light 200 is totally reflected at the upper surface of the cover plate CP. It is because that the total reflection critical angle $T_{CP\_AIR}$ at the interface between the cover plate CP and the air AIR is about 41.4°. That is, when the incident angle θ is larger than the total reflection critical angle $T_{VHOE\_LR}$ at the interface between the light radiating film VHOE and the low refractive layer LR, the incident angle θ is always larger than the total reflection critical angle $T_{CP\_AIR}$ at the interface between the cover plate CP and the air AIR.

The light radiating film VHOE converts a predetermined amount of the propagating light 200 into a radiating light 300 having a reflection angle α and sends the radiating light 300 back into the inside space of the cover plate CP. The radiating light 300 is for detecting an image of an object when the object is contacting on the upper surface of the cover plate CP. When there is no object on the outer surface of the cover plate CP, the radiating light 300 is totally reflected at the upper surface of the cover plate CP and then is provided to the photo sensor (or, optical sensor) disposed at the outside of the bottom surface of the directional optical substrate SLS. That is, after being totally reflected at the upper surface of the cover plate CP, the radiating light 300 goes out of the directional optical substrate SLS through the bottom surface of the cover plate CP. All of the sensing light beams 400 have the same reflecting angle so that the sensing light beams 400 are oriented (or 'directionized') to a predetermined direction.

In detail, the radiating lights 300 are provided from each points of the surface of the cover plate CP. However, the directions of the radiating lights 300 are same, i.e., all radiating lights 300 have the same radiation angle. We called the lights having the same radiation angle as the 'directional lights'. The radiating lights 300 having the same radiation angle are provided as the sensing light beams 400. That is, the directional optical substrate SLS according to the present disclosure means an optical element that provides the radiating lights 300 and the sensing light beams 400 having the same radiation angle.

By detecting the sensing light beam 400 radiated out of the low refractive layer LR disposed under the bottom surface of the directional optical substrate SLS, the images of the object contacted on the upper surface of the cover plate CP may be recognized. Hereinafter, we will explain about the image sensing device applying the directional optical unit as shown in FIG. 1. Specifically, we focus on a flat panel display embedding a fingerprint recognizing sensor.

Figure 3A:
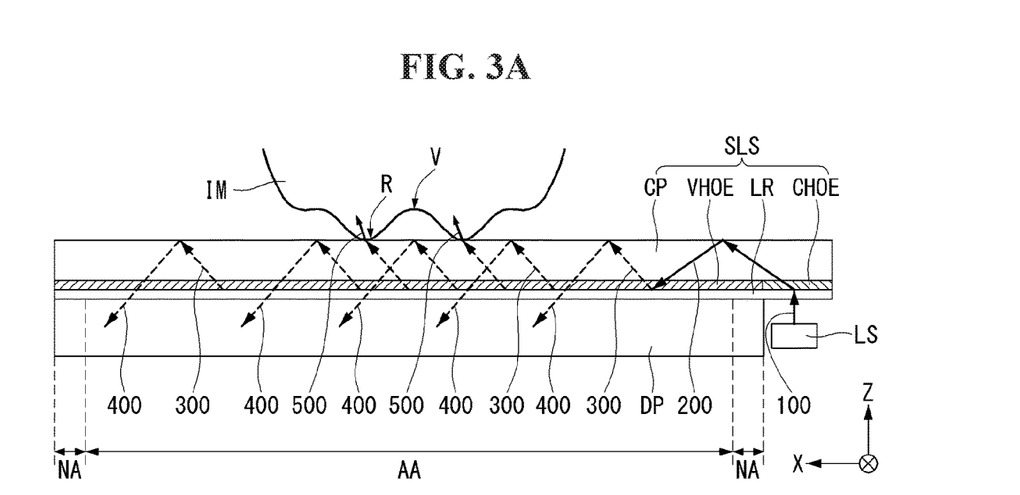
FIGS. 3A and B are drawings illustrating a structure of a flat panel display embedding an optical image sensor including a directional optical unit and an optical sensor, according to the first embodiment of the present disclosure.
Figure 3B:
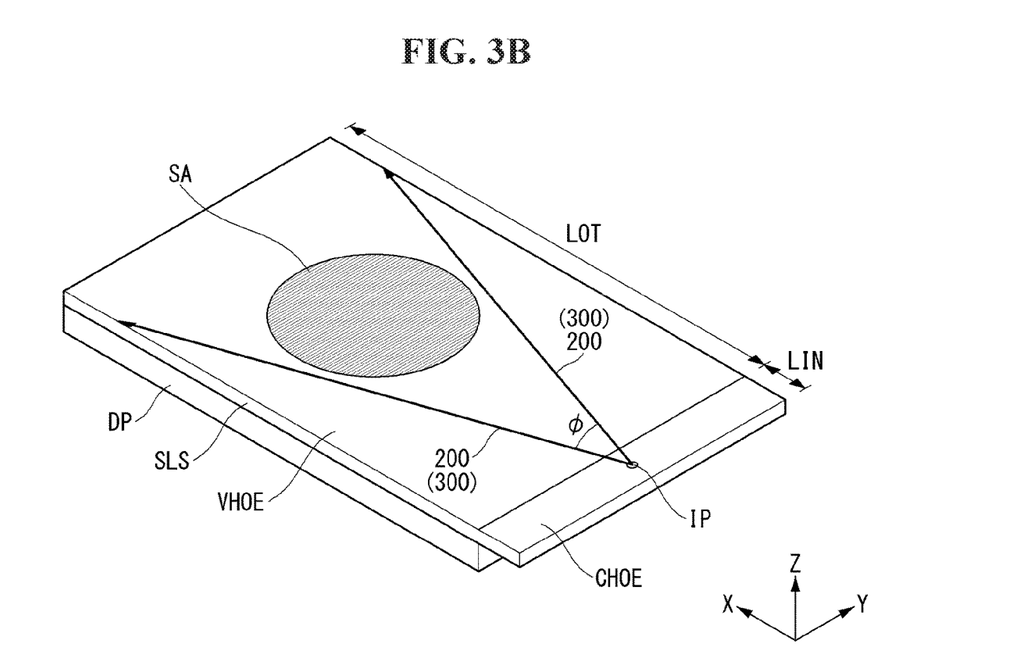

FIGS. 3A and B are drawing illustrating a structure of a flat panel display embedding an optical image sensor including a directional optical unit and an optical sensor, according to the first embodiment of the present disclosure.

Referring to FIG. 3A, a flat panel display embedding an optical image sensor according to the first embodiment of the present disclosure comprises a display panel DP, a directional optical substrate SLS and a light source LS. The display panel DP includes a display area AA and a non-display area NA. The display area AA may be disposed at the middle portions of the display panel DP. The non-display area NA may be surrounding the display area AA. The display area AA may have a plurality of the display elements for representing the video images shown on the display panel DP. The non-display area may have a plurality of the driving elements for operating the display elements arrayed in the display area AA.

In detail, a plurality of pixel area for representing the video images may be arrayed in a matrix manner in the display area AA. At least one of the pixel areas, one photo sensor may be included for detecting the image of the object. In some cases, one photo sensor may be disposed at one group of the pixel areas. For example, one photo sensor may be disposed at every pixel group including 2×2, 3×3 or 4×4 pixels.

The directional optical substrate SLS may be a thin plate having a predetermined length, width and thickness. It is preferable that the length and width of the directional optical substrate SLS has a size corresponding to the size of the display panel DP. Specifically, it is preferable that the directional optical substrate SLS has a size slightly larger than that of the display panel DP. At least, it is preferable that the directional optical substrate SLS has an extended (or expanded) area over one side of the display panel DP. At the extended side area over the display panel DP, the light source LS may be disposed.

The directional optical substrate SLS may be joined with the display panel DP as it is attached on the upper surface of the display panel DP. The directional optical substrate SLS includes a cover plate CP, a light incident film CHOE, a light radiating film VHOE and a low refractive layer LR, as mentioned above. It is preferable that the low refractive layer LR is attached on the upper surface of the display panel DP as facing each other. Here, the upper surface of the display panel DP is the front face providing the video images from the display panel DP. That is, the user observes the video image as seeing the upper surface of the display panel DP.

The directional optical substrate SLS, as mentioned above, may provide the image sensing light beam 400 to the bottom surface of the cover plate CP, which faces with the upper surface of the display panel DP. Therefore, the photo sensor disposed in the display panel DP located under the directional optical substrate SLS may detect the image sensing light beam 400. As the results, the images of the object contacting on the upper surface of the directional optical substrate SLS may be recognized.

In detail, the radiating light 300 generated by the light radiating film VHOE of the directional optical substrate SLS would reach to the upper surface of the cover plate CP. When an object IM is disposed on the cover plate CP, the radiating light 300 that hits the areas where the object IM is not contacting the upper surface of the cover plate CP is totally reflected and provided to the display panel DP as the sensing light beam 400. On the contrary, the radiating light 300 that hits the area where the object IM is directly contacting the upper surface of the cover plate CP (e.g., at ridge R) is refracted and goes out through the cover plate CP.

At the point where the object IM having the refraction index larger than that of air is contacting, the radiating light 300 is not totally reflected but it is refracted into the object IM. That is, at the area where the object IM is contacting, the radiating light 300 would be an absorbed light 500 so that it is not provided to the photo sensor of the display panel DP.

As the results, the photo sensor of the display panel DP detects only the sensing light beams 400 except the absorbed lights 500 among the radiating lights 300. Detecting the reflection patterns of the sensing light beams 400 reflected at the top surface of the cover plate CP, the photo sensors of the display panel DP reproduces the patterns or images of the object IM.

When applying the directional optical unit to the fingerprint sensor, the object IM would be the finger of the human. The ridge R of the fingerprint is contacting on the top surface of the cover plate CP but the valley V of the fingerprint is not contacting with the top surface of the cover plate CP. The radiating lights 300 that hit the upper surface of the cover plate CP at the valley V are totally reflected to be the sensing light beams 400. In the interim, the radiating lights 300 that hit the upper surface of the cover plate CP at the ridge R are refracted so that they would be the absorbed lights 500 going out of the cover plate CP.

Further referring to the FIG. 3B, we will explain about the process of the image sensing on the XY plane. The incident light 100 may include a collimated infrared light having a predetermined cross sectional area. The light source LS may be an infrared LASER diode (or 'IR LD').

The incident light 100 would be converted to a propagating light 200 by the light incident film CHOE. Here, the propagating light 200 would be expanded as having an expanding angle φ on the XY plane including the length axis on the X axis and the width axis on the Y axis. In the interim, on the XZ plane including the length axis on the X axis and the thickness axis on the Z axis, the initial collimated condition would be maintained.

Here, it is preferable that the expanding angle φ is equal to or slightly larger than the inside angle of two lines connecting from the light incident point IP to the two end points (i.e., the two corners at the opposite side) of the cover plate CP facing the light incident film CHOE, respectively. In this case, the propagating light 200 may be expanded as a triangular shape having the expanding angle φ. As the results, the radiating lights 300 may covers the same area covered as the propagating light 200 is expanded. That is, the image sensing area would be defined inside of the triangular shape. When applying with the fingerprint sensor, the fingerprint sensing area SA may be defined as the circle area hatched in FIG. 3B.

When setting the sensing area SA on the center portion or on upside-shifted portion facing with the light incident film CHOE, it is preferable that the amount (or luminance or brightness) of the radiating lights 300 has a maximum value. To do so, the light radiating film VHOE may be designed as having varying light extraction efficiency according to the functional relationship with the position (i.e., the light radiating film VHOE may have a light extraction efficiency that varies as a function of position along the light radiating film VHOE), to have the maximum value at the area corresponding to the sensing area SA and to have a minimum or the zero value at the other areas (i.e., at areas outside of the sensing area SA).

Figure 4:
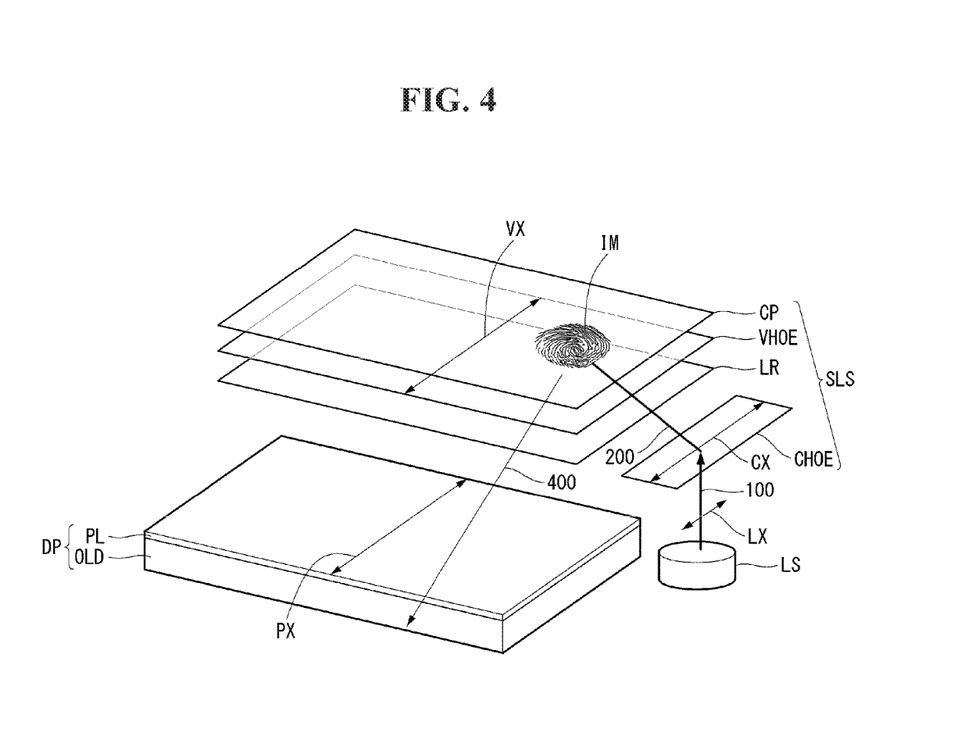
FIG. 4 is a perspective view illustrating a structure of a flat panel display embedding an optical image sensor in which the light efficiency is maximized, according to the first embodiment of the present disclosure.

Referring to FIG. 4, we will explain about a structure for maximizing the light efficiency in the flat panel display embedding an optical image sensor according to the first embodiment of the present disclosure. FIG. 4 is a schematic diagram of the flat panel display embedding an optical image sensor shown in FIG. 3A for convenience. FIG. 4 is a perspective view illustrating a structure of a flat panel display embedding an optical image sensor in which the light efficiency is maximized, according to the first embodiment of the present disclosure.

It is preferable that the optical image sensor according to the present disclosure includes a holographic element for establishing the ultra thin thickness structure. The holographic element has the characteristics those the efficiency is enhanced when the recording is performed so as to have a specific polarization state in accordance with the recording condition. It is preferable that the light source LS providing the polarized lights is used for the flat panel display embedding an optical image sensor according to the present disclosure.

In detail, in the first embodiment, it is preferable that the light incident film CHOE of the directional optical substrate SLS has a specific polarization axis for maximizing the light efficiency. For example, the light incident film CHOE may have an light incident film polarization axis CX set in a direction perpendicular to a plane of incident formed by the incident light 100 and the propagating light 200.

In that case, it is preferable that the light source LS includes a laser diode providing an infrared laser beam polarized in the direction parallel to the light incident polarization axis CS. For example, the light source LS preferably includes a laser diode providing an infrared laser that has an incident light polarization axis LX parallel to the light incident film polarization axis CX.

In addition, when the light radiating film VHOE is made of a holographic element, it is preferable that the light radiating film VHOE has a specific polarization axis for maximizing the radiating efficiency. For example, it is preferable that the light radiating film VHOE is a holographic element having a radiating light polarization axis VX having the same polarization axis as the light incident film polarization axis CX and the incident light polarization axis LX.

In some embodiments, the display panel DP may include an organic light emitting diode display panel OLD as shown in FIG. 4. Inside of the organic light emitting diode display panel OLD, the display elements and the optical sensors are arrayed. In this case, a polarization plate PL may be attached or laminated on the upper surface of the organic light emitting diode display panel OLD. This polarization plate PL is for preventing external lights from being reflected from the surface of the organic light emitting diode display panel OLD to obstruct the user's perception of the information provided by the display device. Therefore, in order to maximize the light efficiency of the sensing light beam 400 in the image recognition, it is preferable that the polarization axis PX of the polarization plate PL is also arranged so as to be parallel to the incident light polarization axis LX, the light incident film polarization axis CX and the radiating light polarization axis VX.

In other example, even though it is not shown in figures, the display panel DP may include a liquid crystal display panel. Inside of the liquid crystal display panel, a plurality of display elements and a plurality of the optical sensors are arrayed. On the upper surface of the liquid crystal display panel, an upper polarization plate is attached. Under the bottom surface of the liquid crystal display panel, a lower polarization plate is attached. The polarization axes of the upper polarization plate and the lower polarization plate are perpendicular each other. For the case that the display device embedding the optical image sensor according to the first embodiment, it is preferable that the incident light polarization axis LX coincides with the polarization axis of the upper polarization plate of the liquid crystal display panel.

For the directional optical substrate SLS and the light source LS according to the first embodiment, in order to maximize the light efficiency, it is preferable that the incident light polarization axis LX, the light incident film polarization axis CX and the radiating light polarization axis VX have the same polarization direction. Specifically, for the display panel embedding the image sensor according to the first embodiment, the polarization plate PL disposed at the upper surface of the display panel DP has the polarization direction PX of which polarization direction is the same as the direction of the incident light polarization axis LX, the light incident film polarization axis CX and the radiating light polarization axis VX.

<Second Embodiment>

Hereinafter, referring to FIGS. 5 to 7, we will explain about the second embodiment of the present disclosure. In the second embodiment, the basic structure is very similar with the first embodiment. The differences are like that: in the first embodiment, the directional optical unit has the structure suitable for sensing the image over the large area covering the whole surface of the cover plate as the expanding the propagating lights over the whole surface of the cover plate. In the second embodiment, the directional optical unit has the structure in which the propagating lights are radiated within some restricted image sensing area, and then the image may be reproduced by detecting the reflected lights within the sensing area.

Figure 5A:
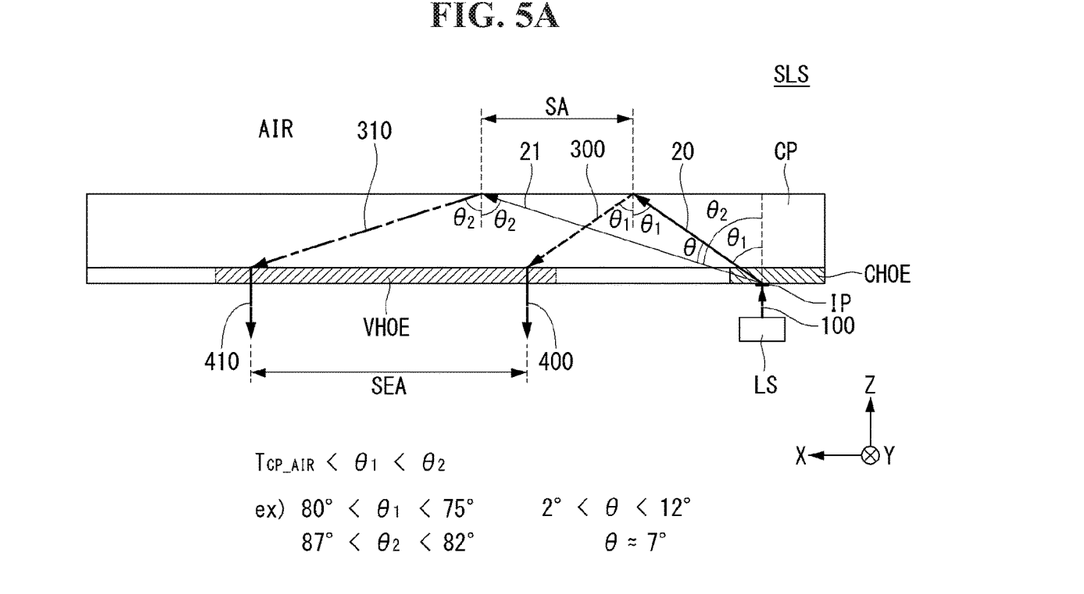
FIGS. 5A and 5B are drawings illustrating a structure of a directional optical substrate applied for a flat panel display embedding an optical image sensor according to a second embodiment of the present disclosure.

At first referring to FIG. 5A, we will explain about the directional optical unit according to the second embodiment. FIG. 5A is a drawing illustrating a structure of a directional optical substrate applied for a flat panel display embedding an optical image sensor according to a second embodiment of the present disclosure. In FIG. 5A, the upper drawing is a side view on the XZ plane and FIG. 5B is a plane view on the XY plane.

Referring to FIG. 5A, a directional optical unit according to the second embodiment comprises a directional optical substrate SLS and a light source LS. The directional optical substrate SLS includes a cover plate CP, a light radiating film VHOE and a light incident film CHOE. The cover plate CP may have a rectangular plate shape of which a length, a width and a thickness. In FIG. 5A, the length is along to X-axis, the width is along to Y-axis and the thickness is along to Z-axis.

The directional optical substrate SLS is an optical device to provide the sensing light for detecting the image by expanding restrict within a sensing area (or 'detecting area') and to provide the sensed light for reproducing the image. The light source LS may be same as the first embodiment.

On the upper surface of the cover plate CP, a sensing area SA (or 'detecting area') is defined. When applying with the fingerprint sensor, it is preferable that the sensing area SA is set a position suitable for the user to place user's fingerprint on the surface of the cover plate CP. For example, a polygonal area may be defined at the ⅓ position from one side to the center of the rectangular cover plate CP. In this case, the sensing area SA may have the size in the range of (4 mm×4 mm) to (10 mm×10 mm). Here, the size of (4 mm×4 mm) is set by considering the minimum size for detecting the fingerprint. The size of (10 mm×10 mm) is set by considering the average size of the thumbprint of a person.

On the bottom surface of the cover plate CP, the light radiating film VHOE and the light incident film CHOE is attached. The light incident film CHOE is an optical element for expanding and/or diffusing the lights having small circular cross-sectional area provided from the light source LS to cover the sensing area SA. It is preferable that the light incident film CHOE is disposed outside of and an adjacent to the light radiating film VHOE. Specifically, the light incident film CHOE is disposed as facing with the light source LS.

The light radiating film VHOE is an optical element for sending the lights used for detecting the image to the image sensor. The light radiating film VHOE is disposed at the position where the lights reflected by the object disposed on the surface of the sensing area SA are reached. Specifically, it is preferable that the light radiating film VHOE includes a holographic element providing the sensing lights to a perpendicular direction to the lower surface of the cover plate CP, in order to enhance the accuracy of the image sensing ability. Further, it is preferable that the light radiating film VHOE is a holographic element for providing the sensing lights to the image sensor (or 'image detector') disposed outside of the directional optical substrate SLS, especially disposed under the lower surface of the cover plate CP.

The light source LS is disposed as facing with the light incident film CHOE under the light incident film CHOE. It is preferable that the light source LS provides highly collimated lights such as laser beam. Specifically, when applying to the system in which the fingerprint sensor is embedded into a portable display, it is preferable that the light source LS provides the infrared laser beam which cannot be recognized by the human eyes. For example, the light source LS may be an infrared laser diode providing the infrared laser beam.

The collimated light from the light source LS, as an incident light 100, having a point shape or a tiny circular cross sectional area is provided to a light incident point IP defined on the light incident film CHOE. It is preferable that the incident light 100 enters onto the normal direction with respect to the surface of the incident point IP. However, embodiments provided by the present disclosure are not restricted as such. For example, in one or more embodiments, the incident light 100 may enter onto the incident point IP with an inclined angle with respect to the normal direction.

The light incident film CHOE converts the incident light 100 provided from the light source LS into the scan lights 20 and 21 for detecting the image. The scan lights 20 and 21 are refracted lights inside of the cover plate CP, and are satisfying the total reflective condition at the upper surface of the cover plate CP. It is preferable that the light incident film CHOE has larger area than the incident point IP where the incident light 100 hits. For example, when the cross sectional area of the light from the light source LS is 0.5 mm×0.5 mm, the light incident film CHOE may be disposed at the center of the one side of the cover plate CP and have a square or a rectangular shape having a width and length in rage of 3 mm~5 mm each.

The incident light 100 collimated point light is converted into the scan lights 20 and 21 by the light incident film CHOE. The scan lights 20 and 21 are expanded into an area corresponding to the sensing area SA defined on the upper surface of the cover plate CP. In order to extend the light source LS having the tiny circular cross sectional area into the sensing area SA having a larger area enough to detect the image, the light incident film CHOE may be a holographic optical element for converting the incident light 100 to have a vertical expanding angle θ on the XZ plane and a horizontal expanding angle φ on the XY plane.

The scan lights 20 and 21 used for image detection are totally reflected on the surface of the cover plate CP and proceeds to the lower surface as radiating lights 300 and 310. It is preferable that the light radiating film VHOE is a holographic optical element that changes the direction of travel of the radiating lights 300 and 310 in a direction perpendicular to the surface of the cover plate CP so as to provide as sensing light beams 400 and 410. Therefore, it is preferable that the light radiating film VHOE is arranged in a region irradiated with the radiating lights 300 and 310 on the lower surface of the cover plate CP, and has a larger area than the region irradiated with the radiating lights 300 and 310.

It is preferable that the light radiating film VHOE and the light incident film CHOE may be disposed on the same plane level. Considering the manufacturing process, it is further preferable that the light radiating film VHOE and the light incident film CHOE are formed as being separated each other, on a same film. It is preferable that the light radiating film VHOE and the light incident film CHOE may be optical elements having the holographic patterns. For example, after disposing the master film for the light radiating film VHOE and the master film for the light incident film CHOE at proper positions, respectively, these two holographic patterns may be copied on one holographic recording film, at the same time. So that, the light radiating film VHOE and the light incident film CHOE may be formed on one film sheet.

Hereinafter, we will explain about a specific operation procedure for image detection in the directional optical substrate SLS according to the present disclosure. The incident light 100 is converted into the scan lights 20 and 21 by the light incident film CHOE. The scan lights 20 and 21 satisfying the total reflection condition at the upper surface of the cover plate CP enter into the cover plate CP. For example, the light incident film CHOE converts the incident light 100 into the refracted expanding lights in the range from the first scan light 20 having the first incident angle $\theta_1$ to the second scan light 21 having the second incident angle $\theta_2$. Here, it is preferable that the first incident angle $\theta_1$ and the second incident angle $\theta_2$ are larger than the total reflection critical angle $T_{CP\_AIR}$ at the interface between the cover plate CP and the air AIR.

The first scan light 20 hits the first edge line of the sensing area SA closest to the light source LS. The second scan light 21 hits the second edge line of the sensing area SA furthest from the light source LS. The first incident angle $\theta_1$ of the first scan light 20 and the second incident angle $\theta_2$ of the second scan light 21 satisfy the total reflection condition at the upper surface of the cover plate CP. For example, the first incident angle $\theta_1$ may have any one angle value in range of 75 degree to 80 degree, inclusive. The second incident angle $\theta_2$ of the second scan light 21 may have any one angle value in range of 82 degree to 87 degree, inclusive. Especially, the vertical expanding angle $\theta$ which is an angle between the first incident angle $\theta_1$ and the second incident angle $\theta_2$ may have any one angle value in range of 2 degree to 12 degree, inclusive. More preferably, the vertical expanding angle $\theta$ may be 7 degree.

In addition, on the XY plane (or, 'horizontal plane') having the length axis and the width axis, the first scan light 20 and the second scan light 21 has a horizontal expanding angle, $\varphi$ between the first scan light 20 and the second scan light 21. The ranges of the vertical expanding angle $\theta$ and the horizontal expanding angle $\varphi$ define the sensing area SA. For example, the horizontal expanding angle $\varphi$ may have any one value in rage of 30 degree to 60 degree, inclusive. The detailed sensing area SA may be defined by the vertical expanding angle $\theta$, the horizontal expanding angle $\varphi$ and the thickness of the cover plate CP.

The first scan light 20 and the second scan light 21 are converted into a first radiating light 300 and a second radiating light 310, respectively by totally reflected at the upper surface of the cover plate CP and are go to the bottom surface of the cover plate CP. Here, the first reflection angle of the first radiating light 300 is equal to the first incident angle $\theta 1$. Likewise, the second reflection angle of the second radiating light 310 is equal to the second incident angle $\theta 2$. The total area covered by the first radiating light 300 and the second radiating light 310 at the lower surface of the cover plate CP is defined as the sensor area SEA (or 'detecting element area'). The sensor area SEA is corresponding to the area where the detecting elements are disposed.

It is preferable that the light radiating film VHOE is disposed as being corresponding to the sensor area SEA. Even though there is no light radiating film VHOE, the first radiating light 300 and the second radiating light 310 may go out of the cover plate CP when any substrate or film is disposed under the cover plate CP. However, as the first radiating light 300 and the second radiating light 310 have the reflection angle and the incident angle satisfying the total reflection condition, a lot of amount of them (the first radiating light 300 and the second radiating light 310) may be reflected back into the cover plate CP. As the results, the detecting strength may be remarkably lowered and then the detection ability is degraded. Therefore, it is preferable that the light radiating film VHOE is disposed as being laminated under the bottom surface of the cover plate CP for sending most amount of the first radiating light 300 and the second radiating light 310 to the optical sensor. Specifically, it is more preferable that the light radiating film VHOE is a holographic optical element for refracting the first radiating light 300 having the reflecting angle of $\theta_1$ and the second radiating light 310 having the reflecting angle $\theta_2$ to the perpendicular direction to the bottom surface of the cover plate CP.

The size of the sensor area SEA is defined by the first radiating light 300 and the second radiating light 310. The sensor area SEA may have a shape continuously expanding from the light incident film CHOE. Further, the sensor area SEA may have more expanded shape than the sensing area SA. In addition, it is preferable that the light radiating film VHOE has larger area than the sensor area SEA.

The light radiating film VHOE converts the first radiating light 300 and the second radiating light 310 into a first sensing light beam 400 and a second sensing light 410, respectively, which go out through the bottom surface of the cover plate CP. The first sensing light beam 400 and the second sensing light 410 are provided to the sensing elements (optical image sensors' or 'photo image sensors') located under the bottom surface of the directional optical substrate SLS and disposed as corresponding to the light radiating film VHOE. By detecting the first sensing light beam 400 and the second sensing light 410 radiated out of the directional optical substrate SLS, the images of the object contacted on the upper surface of the cover plate CP may be recognized.

Figure 5B:
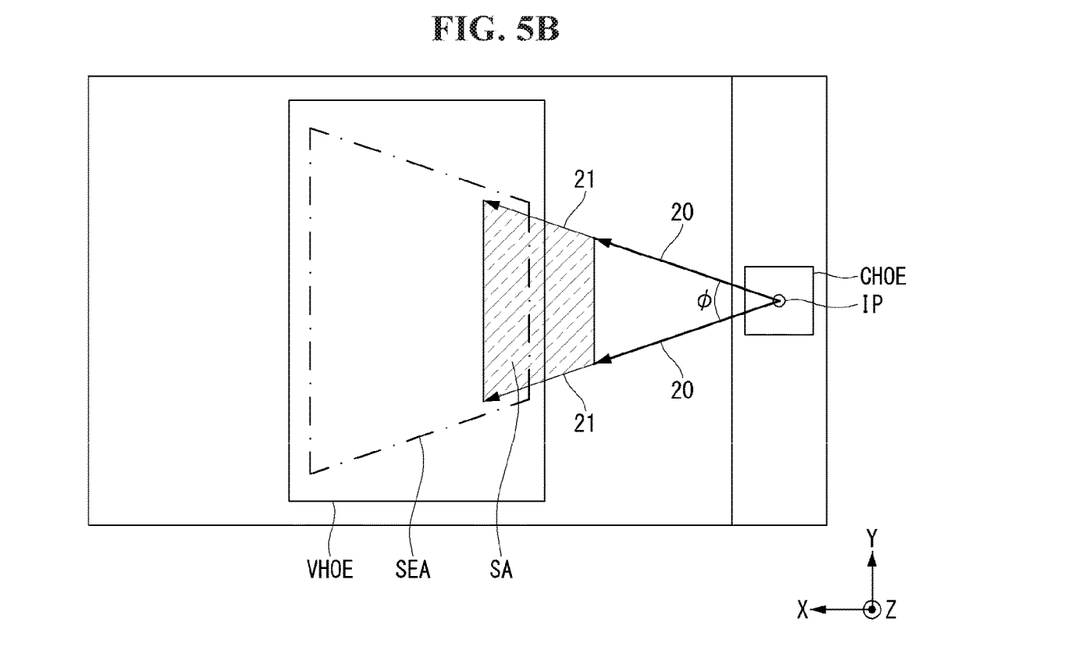

Hereinafter, we will explain about the image sensing device applying the directional optical unit as shown in FIGS. 5A and 5B. Specifically, we focus on a flat panel display embedding a fingerprint recognizing sensor.

Figure 6A:
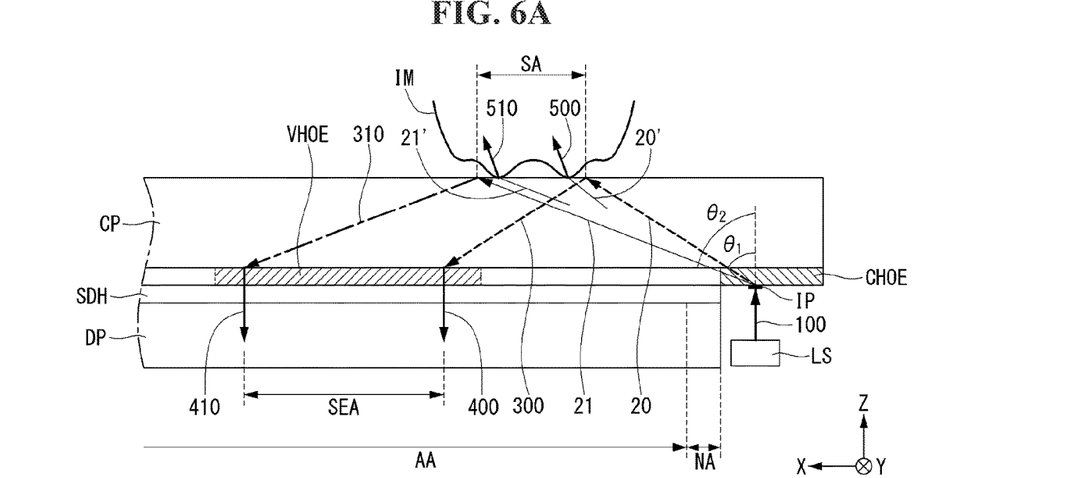
FIGS. 6A and 6B are drawings illustrating a structure of a flat panel display embedding an optical image sensor including a directional optical unit and an optical sensor, according to the second embodiment of the present disclosure.
Figure 6B:
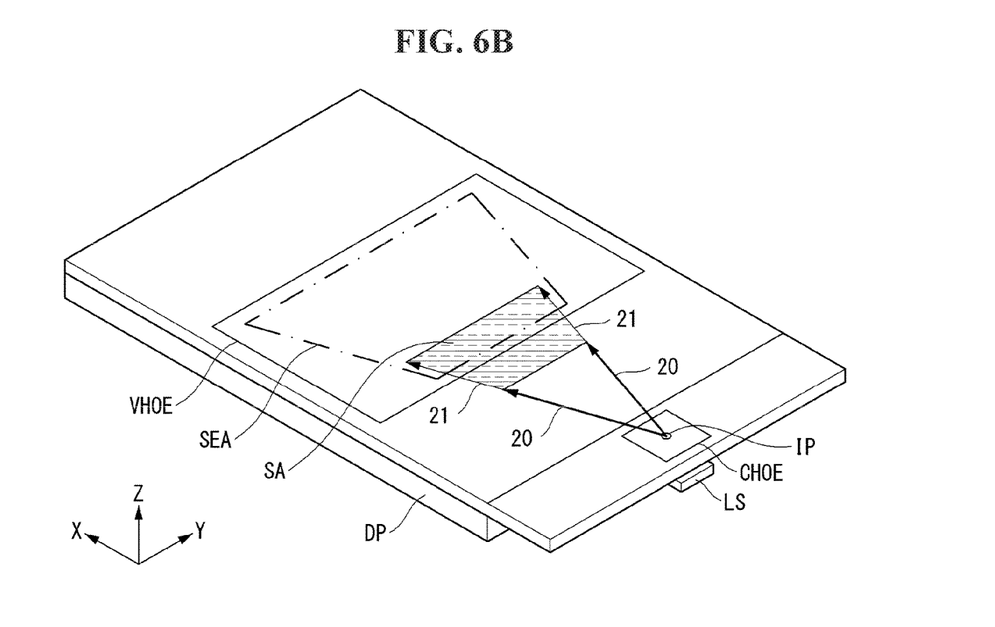

FIGS. 6A and 6B are drawings illustrating a structure of a flat panel display embedding an optical image sensor including a directional optical unit and an optical sensor, according to the second embodiment of the present disclosure.

Referring to FIG. 6A, a flat panel display embedding an optical image sensor according to the second embodiment of the present disclosure comprises a display panel DP, a directional optical substrate SLS and a light source LS. The display panel DP includes a display area AA and a non-display area NA. The display area AA may be disposed at the middle portions of the display panel DP. The non-display area NA may be surrounding the display area AA. The display area AA may have a plurality of the display elements for representing the video images shown on the display panel DP. The non-display area may have a plurality of the driving elements for operating the display elements arrayed in the display area AA.

In detail, a plurality of pixel area for representing the video images may be arrayed in a matrix manner in the display area AA. At least one of the pixel areas, one photo sensor may be included for detecting the image of the object. In some cases, one photo sensor may be disposed at one group of the pixel areas. For example, one photo sensor may be disposed at every pixel group including 2×2, 3×3 or 4×4 pixels.

The directional optical substrate SLS may be a thin plate having a predetermined length, width and thickness. It is preferable that the length and width of the directional optical substrate SLS has a size corresponding to the size of the display panel DP. Specifically, it is preferable that the directional optical substrate SLS has a size slightly larger than that of the display panel DP. At least, it is preferable that the directional optical substrate SLS has an extended (or expanded) area over one side of the display panel DP. At the extended side area over the display panel DP, the light source LS may be disposed.

The directional optical substrate SLS may be joined with the display panel DP as it is attached on the upper surface of the display panel DP by an optical adhesive layer SDH. The directional optical substrate SLS includes a cover plate CP, a light incident film CHOE and a light radiating film VHOE, as mentioned above. It is preferable that the light radiating film VHOE is attached on the upper surface of the display panel DP as facing each other. Here, the upper surface of the display panel DP is the front face providing the video images from the display panel DP. That is, the user observes the video image as seeing the upper surface of the display panel DP.

The directional optical substrate SLS, as mentioned above, may provide the image sensing light beams 400 and 410 to the bottom surface of the cover plate CP, which faces with the upper surface of the display panel DP. Therefore, the photo sensor disposed in the display panel DP located under the directional optical substrate SLS may detect the image sensing light beams 400 and 410. As the results, the images of the object contacting on the upper surface of the directional optical substrate SLS may be recognized.

In detail, the scan lights 20 and 21 generated by the light incident film CHOE of the directional optical substrate SLS would reach to the upper surface of the cover plate CP. When an object IM is disposed on the cover plate CP, the scan lights 20 and 21 those hit the areas where the object IM is not contacting the upper surface of the cover plate CP are totally reflected as the radiating lights 300 and 310 and then the radiating lights 300 and 310 are refracted and provided to the display panel DP as the sensing light beams 400 and 410. On the contrary, the scan lights 20' and 21' those hit the area where the object IM is directly contacting the upper surface of the cover plate CP (e.g., at ridge R) are refracted and goes out through the cover plate CP. At the point where the object IM having the refraction index larger than that of air is contacting, the scan lights 20' and 21' are not totally reflected but they are refracted into the object IM. That is, at the area where the object IM is contacting, the scan lights 20' and 21' would be the absorbed lights 500 and 510 so that they are not provided to the photo sensor of the display panel DP.

As the results, the photo sensor of the display panel DP detects only the sensing light beams 400 and 410 except the absorbed lights 500 and 510 from the scan lights 20, 20', 21 and 21'. Detecting the reflection patterns of the sensing light beams 400 and 410 reflected at the top surface of the cover plate CP and perpendicularly controlled (or refracted) by the light radiating film VHOE, the photo sensors of the display panel DP reproduces the patterns or images of the object IM.

When applying the directional optical unit to the fingerprint sensor, the object IM would be the finger of the human. The ridge R of the fingerprint is contacting on the top surface of the cover plate CP but the valley V of the fingerprint is not contacting with the top surface of the cover plate CP. The scan lights 20 and 21 those hit the upper surface of the cover plate CP at the valley V are totally reflected to be the radiating lights 300 and 310. In the interim, the scam lights 20' and 21' those hit the upper surface of the cover plate CP at the ridge R are refracted so that they would be the absorbed lights 500 and 510 going out of the cover plate CP.

Further referring to drawing of FIG. 6B, we will explain about the process of the image sensing on the XY plane. The incident light 100 may include a collimated infrared light having a predetermined cross sectional area. The light source LS may be an infrared LASER diode (or 'IR LD').

The incident light 100 would be converted to scan lights 20 and 21 by the light incident film CHOE. Here, the scan lights 20 and 21 would be expanded as having a horizontal expanding angle φ on the XY plane including the length axis on the X axis and the width axis on the Y axis. In the interim, on the XZ plane including the length axis on the X axis and the thickness axis on the Z axis, the scan lights 20 and 21 would be expanded as having a vertical expanding angle θ.

The sensing area SA is defined on the upper surface of the cover plate CP by the horizontal expanding angle φ and the vertical expanding angle θ. For example, as shown in hatched area in FIG. 6B, the image sensing area SA may be defined as a trapezoid shape.

It is preferable that the optical image sensor according to the present disclosure includes a holographic element for establishing the ultra thin thickness structure. The holographic element has the characteristics those the efficiency is enhanced when the recording is performed so as to have a specific polarization state in accordance with the recording condition. It is preferable that the light source LS providing the polarized lights is used for the flat panel display embedding an optical image sensor according to the present disclosure.

Figure 7:
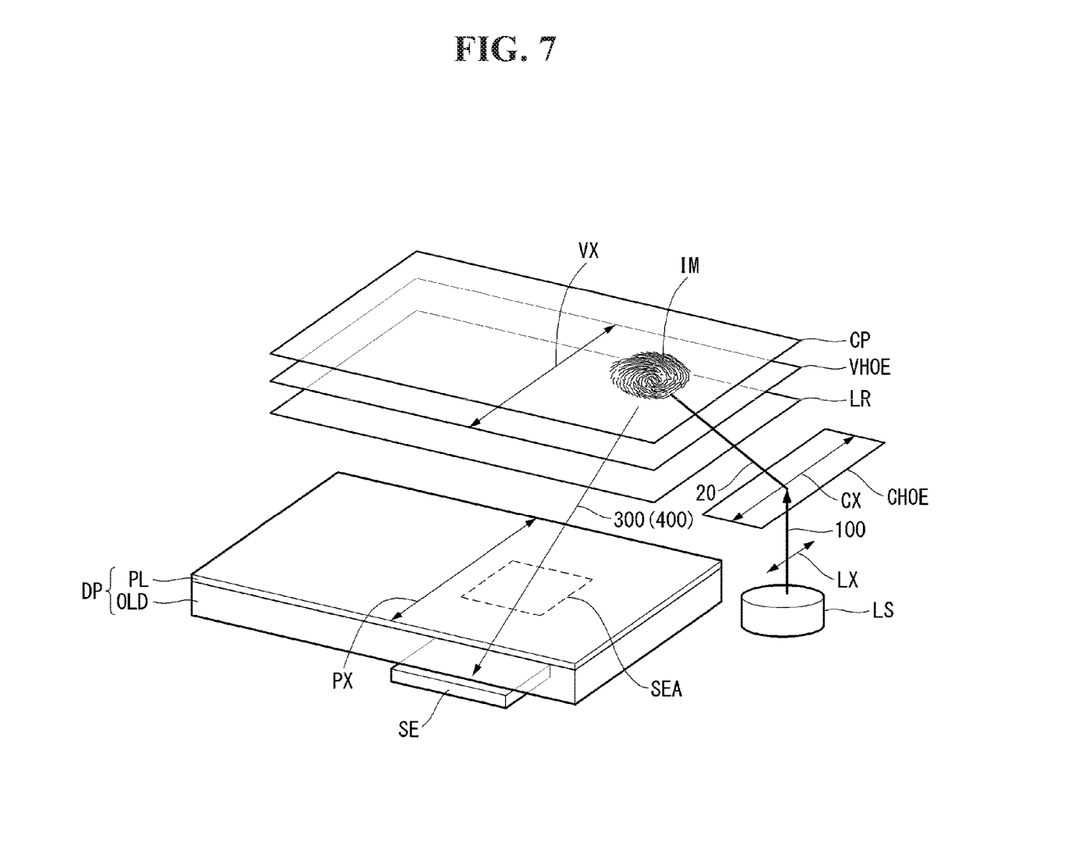
FIG. 7 is a perspective view illustrating a structure of a flat panel display embedding an optical image sensor in which the light efficiency is maximized, according to the second embodiment of the present disclosure.

Referring FIG. 7, we will explain in detail. FIG. 7 is a perspective view illustrating a structure of a flat panel display embedding an optical image sensor in which the light efficiency is maximized, according to the second embodiment of the present disclosure.

In the second embodiment, it is preferable that the light incident film CHOE of the directional optical substrate SLS has a specific polarization axis for maximizing the light efficiency. For example, the light incident film CHOE may have an light incident film polarization axis CX set in a direction perpendicular to a plane of incident formed by the incident light 100 and the scan light 20.

In that case, it is preferable that the light source LS includes a laser diode providing an infrared laser beam polarized in the direction parallel to the light incident polarization axis CS. For example, the light source LS preferably includes a laser diode providing an infrared laser that has an incident light polarization axis LX parallel to the light incident film polarization axis CX.

In addition, when the light radiating film VHOE is made of a holographic element, it is preferable that the light radiating film VHOE has a specific polarization axis for maximizing the radiating efficiency. For example, it is preferable that the light radiating film VHOE is a holographic element having a radiating light polarization axis VX having the same polarization axis as the light incident film polarization axis CX and the incident light polarization axis LX.

In some embodiments, the display panel DP may include an organic light emitting diode display panel OLD as shown in FIG. 7. The optical sensors may be disposed under the display panel DP. In this case, a polarization plate PL may be attached or laminated on the upper surface of the organic light emitting diode display panel OLD. This polarization plate PL is for preventing external lights from being reflected from the surface of the organic light emitting diode display panel OLD to obstruct the user's perception of the information provided by the display device. Therefore, in order to maximize the light efficiency of the sensing light beam 400 in the image recognition, it is preferable that the polarization axis PX of the polarization plate PL is also arranged so as to be parallel to the incident light polarization axis LX, the light incident film polarization axis CX and the radiating light polarization axis VX.

In other example, even though it is not shown in figures, the display panel DP may include a liquid crystal display panel. The optical sensors SE may be disposed under the display panel DP. On the upper surface of the liquid crystal display panel, an upper polarization plate is attached. Under the bottom surface of the liquid crystal display panel, a lower polarization plate is attached. Therefore, it is preferable that the lights generated from the light source LS has the wavelength condition not optically affected by the upper polarization plate and the lower polarization plate. For example, the light source LS may provide a polarized infrared light, and the upper polarization plate and the lower polarization plate are made as working to the visible light wavelength.

For the directional optical substrate SLS and the light source LS according to the first embodiment, in order to maximize the light efficiency, it is preferable that the incident light polarization axis LX, the light incident film polarization axis CX and the radiating light polarization axis VX have the same polarization direction. Specifically, for the case that the optical sensor SE is not disposed inside of the display panel DP but disposed outside of the display panel DP, it is preferable that the light source LS provides lights (i.e., infrared light) having the wavelength range of which polarization state is not affected by the polarization plate for polarizing the visible lights (wavelength range of 40 nm to 700 nm).

While the embodiment of the present invention has been described in detail with reference to the drawings, it will be understood by those skilled in the art that the invention can be implemented in other specific forms without changing the technical spirit or essential features of the invention. Therefore, it should be noted that the forgoing embodiments are merely illustrative in all aspects and are not to be construed as limiting the invention. The scope of the invention is defined by the appended claims rather than the detailed description of the invention. All changes or modifications or their equivalents made within the meanings and scope of the claims should be construed as falling within the scope of the invention.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A flat panel display embedding an image sensor comprising:
    a display panel including a display area and a non-display area, the display panel having a top surface; and
    a directional optical unit attached to the top surface of the display panel, the directional optical unit having a length along a length axis of the display panel, a width along a width axis of the display panel and a thickness along to a thickness axis of the display panel,
    wherein the directional optical unit includes:
        a cover plate having a size corresponding to the length and the width of the directional optical unit;
        a light radiating film corresponding to the display area, the light radiating film positioned under the cover plate;
        a light incident film positioned under the cover plate and disposed outside of the display area adjacent to a lateral side of the light radiating film;
        a low refractive layer disposed under the light radiating film and the light incident film, the low refractive layer attached on the top surface of the display panel, and having a refractive index that is lower than a refractive index of the cover plate and that is lower than a refractive index of the light radiating film; and
        a light source positioned under the light incident film,
    wherein the directional optical unit provides a sensing light beam to the display area,
    wherein the sensing light beam is collimated and directionized along a predetermined direction,
    wherein the light source provides an incident light beam to an incident point on a surface of the light incident film,
    wherein the light incident film has a first polarization axis along to a predetermined direction; and
    wherein the light source provides an infrared light beam polarized in a second polarization axis which is parallel to the first polarization axis.

2. The device according to the claim 1, wherein the light radiating film has a third polarization axis parallel to the first polarization axis.

3. The device according to the claim 1, wherein the display panel further includes a polarization plate disposed on the top surface and having a fourth polarization axis parallel to the first polarization axis.

4. The device according to the claim 1, wherein the light incident film includes a first holographic pattern that converts the incident light beam to a propagating light having an incident angle satisfying an internal total reflection condition of the cover plate, and that transmits the propagating light beam into the cover plate; and
    wherein the light radiating film includes a second holographic pattern that converts a first portion of the propagating light beam into the sensing light beam, the sensing light beam having a reflection angle that satisfies a total reflection condition at a top surface of the cover plate and that satisfies a transmitting condition through the low refractive layer.

5. The device according to the claim 1, wherein the propagating light beam has an expanding angle on a horizontal plane including the length axis and the width axis, and the propagating light beam maintains the collimated state on a vertical plane including the length axis and the thickness axis;
    wherein the incident angle is larger than an internal total reflection critical angle at a first interface between the light radiating film and the low refractive layer; and wherein the reflection angle is larger than a total reflection critical angle at a second interface between the cover plate and an air layer, and smaller than a total reflection critical angle at the first interface between the light radiating film and the low refractive layer.

* * * * *